United States Patent
Ikeda et al.

(10) Patent No.: US 6,922,490 B2
(45) Date of Patent: Jul. 26, 2005

(54) IMAGE COMPRESSION OF SELECTED REGIONS BASED ON TRANSMISSION BIT RATE, MOTION, AND/OR REGION INFORMATION, AND BIT SELECTION BEFORE COMPRESSION BASED ON TRANSMISSION BIT RATE

(75) Inventors: Tomoaki Ikeda, Hyogo (JP); Mamoru Inamura, Tokyo (JP); Junko Kijima, Tokyo (JP); Yoshiko Hatano, Tokyo (JP); Kazuhiro Sugiyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 600 days.

(21) Appl. No.: 09/816,324

(22) Filed: Mar. 26, 2001

(65) Prior Publication Data

US 2001/0053251 A1 Dec. 20, 2001

(30) Foreign Application Priority Data

Jun. 9, 2000 (JP) .................................. 2000-173681

(51) Int. Cl.[7] ................................................. G06K 9/36
(52) U.S. Cl. ..................................... 382/236; 382/239
(58) Field of Search ............................... 382/236, 239, 382/232, 243, 248, 250, 311; 375/240.02, 240.07, 240.08, 240.16, 240.2, 240.21, 240.24, 240.29; 348/403.1, 407.1

(56) References Cited

U.S. PATENT DOCUMENTS

| 5,128,776 | A | | 7/1992 | Scorse et al. ............... 382/240 |
| 5,635,985 | A | | 6/1997 | Boyce et al. |
| 5,668,352 | A | * | 9/1997 | Christian et al. ......... 178/18.02 |
| 5,729,295 | A | * | 3/1998 | Okada ........................ 348/416 |
| 5,812,200 | A | | 9/1998 | Normile |
| 5,988,863 | A | | 11/1999 | Demos ........................ 708/203 |
| 6,023,553 | A | | 2/2000 | Boyce et al. |
| 6,028,965 | A | * | 2/2000 | Normile ..................... 382/250 |
| 6,097,435 | A | * | 8/2000 | Stanger et al. ......... 375/240.03 |
| 6,356,664 | B1 | * | 3/2002 | Dunn et al. ................. 382/239 |

FOREIGN PATENT DOCUMENTS

| EP | 0 330 455 A2 | 8/1989 | .......... H04N/7/137 |
| JP | 11-243540 A | 9/1999 | ............ H04N/7/24 |
| WO | WO 00/00933 | 1/2000 | ............. G06T/9/00 |

OTHER PUBLICATIONS

Partial European Search Report dated Mar. 10, 2004, for EP 01 30 2755.

(Continued)

Primary Examiner—Yon J. Couso
(74) Attorney, Agent, or Firm—Birch, Stewart, Kolasch & Birch, LLP (57) ABSTRACT

An image encoding device is provided that can transmit encoded image data without lowering the frame rate even when the transmission speed of the transmission path is lowered. An encoded region designator selects the region that is to be encoded, in the input image, depending on the bit rate of the transmission path. Only such a region that is designated by the encoded region designator is encoded. The encoded region designator may be one which selects the region that is to be encoded, according to the bit rate of the transmission path, and the motion vector detected by the image encoding circuit. As an alternative, an encoded region designator may be used which selects the region that is to be encoded according to the bit rate of the transmission path, and the information on the designated region supplied from the outside. Also, a selector limiting the number of bits of the signal from the image signal input circuit may be provided, and when the bit rate of the transmission path is lowered, the number of bits of the input image may be adaptively switched.

8 Claims, 11 Drawing Sheets

OTHER PUBLICATIONS

Shapiro, Jerome M., Application of the Embedded Wavelet Hierarchical Image Coder to Very Low Bit Rate Image Coding, Statistical Signal and Array Processing, Minneapolis, Apr. 27–30, 1993 Proceedings of the International Conference on Acoustics, Speech and Signal Processing (ICASSP), New York, IEEE, US, vol. 4, Apr. 27, 1993, pps 558–561.

Katata, et al, IEEE Transactions on Consumer, Electronics, vol. 45, No. 3, pp. 661–666, (1999).

* cited by examiner

IMAGE COMPRESSION OF SELECTED REGIONS BASED ON TRANSMISSION BIT RATE, MOTION, AND/OR REGION INFORMATION, AND BIT SELECTION BEFORE COMPRESSION BASED ON TRANSMISSION BIT RATE

BACKGROUND OF THE INVENTION

The present invention relates to an encoding device encoding an image signal.

Figure 12:
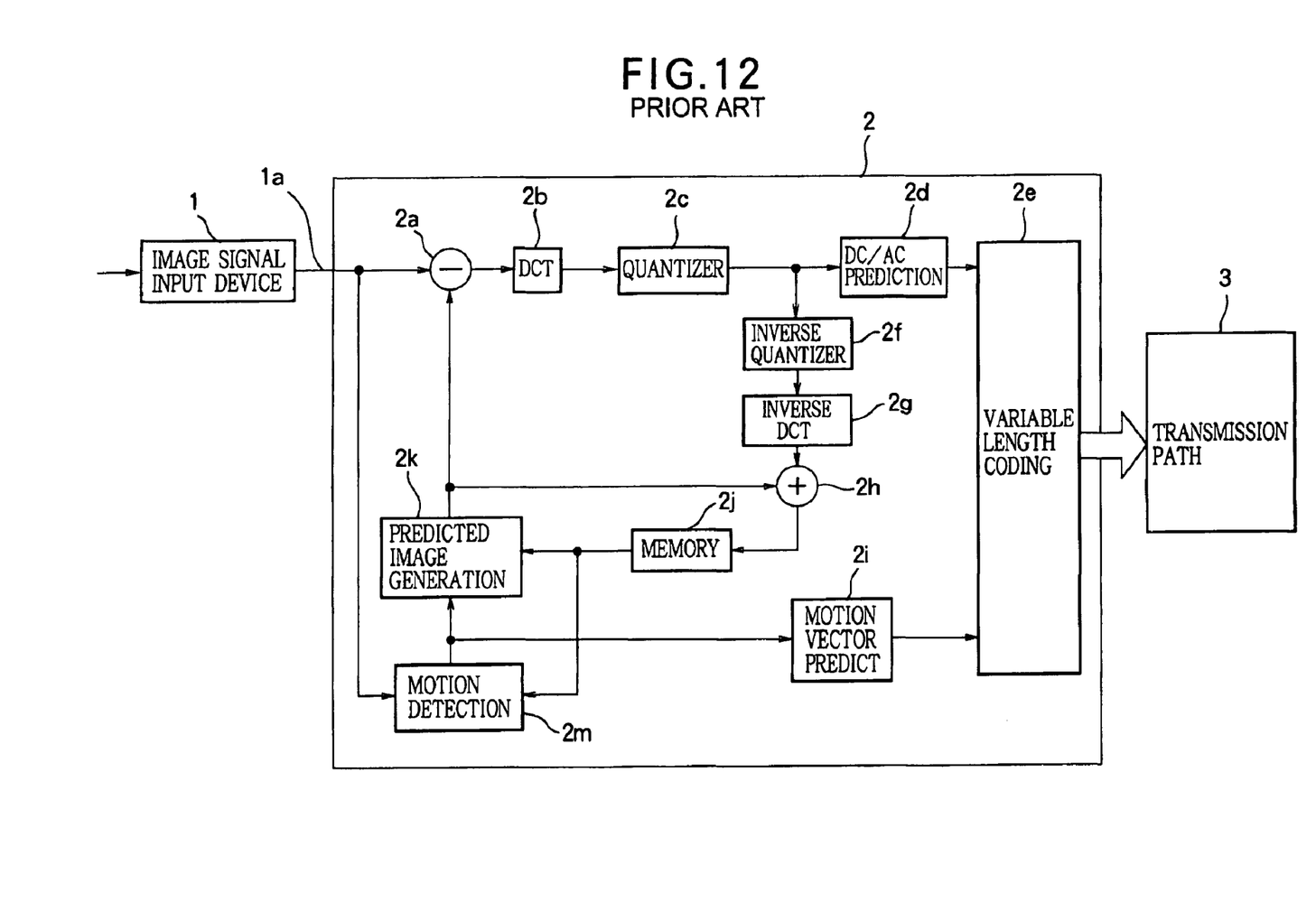
FIG. 12 is a block diagram showing a conventional image encoding device.

FIG. 12 shows a conventional encoding device shown in "All about MPEG-4 (MPEG-4 no subete)" (Kogyo Chosakai), pages 39–40.

In FIG. 12, reference numeral 1 denotes an image signal input circuit receiving an image signal (e.g., R, G and B signals) from an image signal generating device such as a camera, not shown, and converting the image signal into Y, Cb and Cr signals, and dividing the signals into macroblocks to generate block-divided image signals. Reference numeral 2 denotes an image encoding circuit receiving and encoding the block-divided image signals output from the image signal input circuit 1. Reference numeral 3 denotes a transmission path for transmitting the encoded image signals.

The image encoding circuit 2 has a subtractor 2a receiving the input signal as a first input. The output of the subtractor 2a is passed through a DCT circuit 2b, and a quantizer 2c, and input to a DC/AC predictor 2d and an inverse quantizer 2f. The output of the DC/AC predictor 2d is supplied to a first input terminal of a variable length coding circuit 2e, which outputs a bit stream. The output of the inverse quantizer 2f is passed through an inverse DCT circuit 2g and supplied to a first input terminal of an adder 2h. The output of the adder 2h is supplied to a memory 2j, whose output is supplied to a first input terminal of a predicted image generating circuit 2k and a first input terminal of a motion detection circuit 2m. Supplied to a second input terminal of the motion detection circuit 2m is the input signal to the image encoding circuit 2 (the output of the image signal input circuit 1). The output of the motion detection circuit 2m is supplied to a second input terminal of the predicted image generating circuit 2k and the motion vector predictor 2i. The output of the motion vector predictor 2i is supplied to a second input terminal of the variable length coding circuit CIRCUIT 2e. The output of the predicted image generating circuit 2k is supplied to a second input terminal of the subtractor 2a and a second input terminal of the adder 2h.

The output of the image encoding circuit 2 is passed through the transmission path 3 and supplied as a bit stream to a decoding device, not shown.

Figure 13:
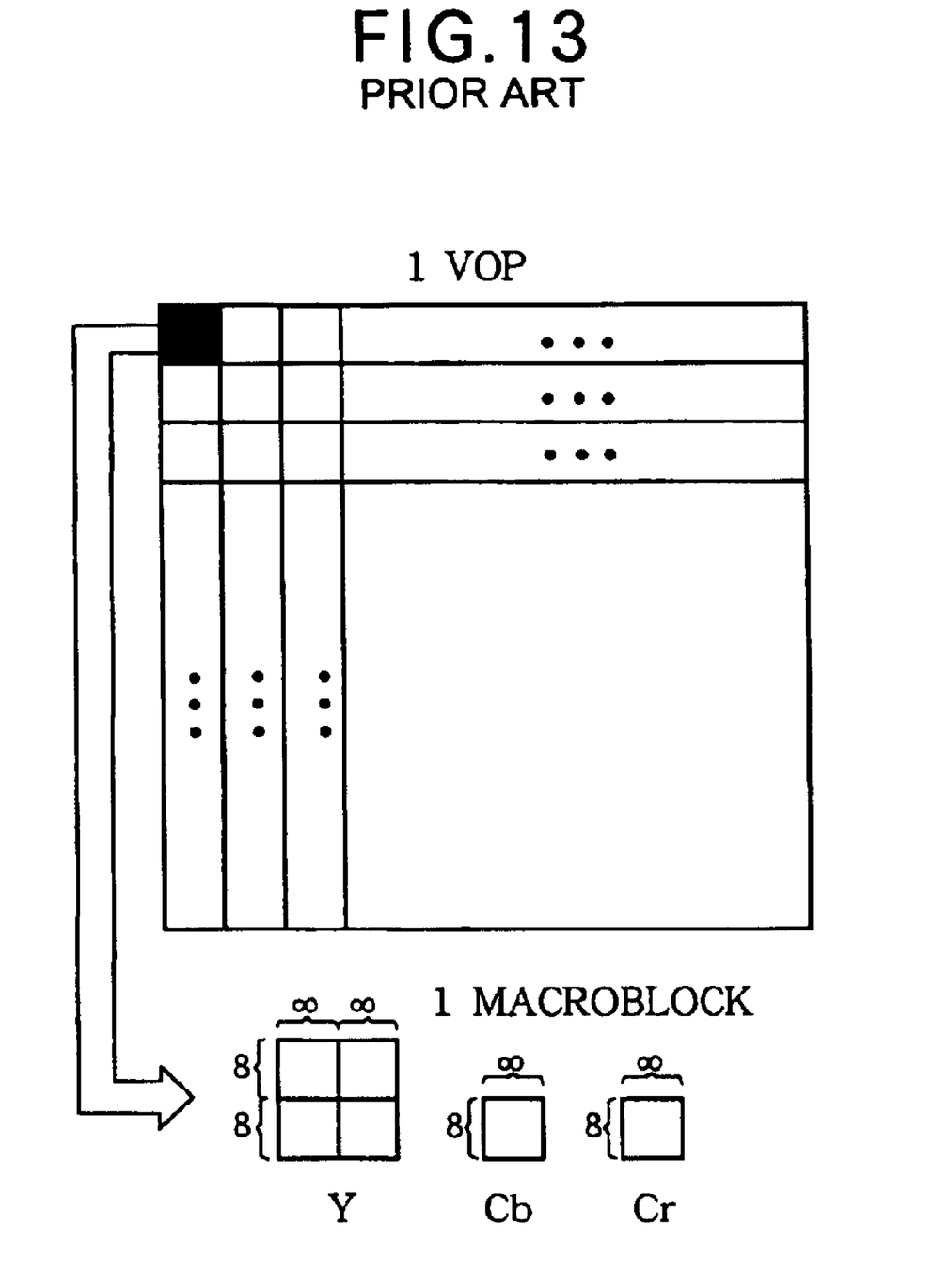
FIG. 13 is a diagram showing input signals to the image encoding circuit.

The operation is next described. The block-divided image signals output from the image signal input circuit 1 and input to the image encoding circuit 2 are signals having been divided into macroblocks, which are basic units of processing, as shown in FIG. 13. That is, when the input image signal is of 4:2:0, 16 pixels by 16 lines of the luminance signal (Y) has the same size on the screen as the 8 pixels by 8 lines of chrominance signals (Cb, Cr), so that 6 blocks of 8 pixels by 8 lines form one macroblock. Here, it is assumed that the input video object plane (VOP) is rectangular, and is identical to a frame.

The image encoding circuit 2 applies discrete cosine transform (DCT) to each block, and then performs quantization. The quantized DCT coefficients are supplied to the DC/AC predictor 2d, where coefficient prediction is performed, and then subjected to variable length coding together with the additional information such as the quantization parameters. This is intra-coding. The VOP for which the intra-coding is performed on all the macroblocks is called an I-VOP.

The quantized DCT coefficients are subjected to inverse quantization and inverse DCT to be decoded, and the decoded image is stored in the memory 2j. The decoded image in the memory 2j is utilized when inter-coding is performed.

In the case of inter-coding, the motion detection circuit 2m detects the motion vector indicating the motion of the input macroblock. The motion vector indicates the position of the decoded image among the decoded images stored in the memory 2j at which the difference with respect to the input macroblock is minimum. The predicted image generating circuit 2k generates a predicted image based on the motion vector. Then a difference between the input macroblock and the predicted image is determined, and the difference signal is subjected to DCT and quantization. The quantized conversion coefficients are variable-length encoded together with the predictive-coded motion vector, supplied via the motion vector predictor 2i, and the additional information such as the quantization parameters. The quantized DCT coefficients are subjected to inverse quantization and inverse DCT, and added (at the adder 2h) to the predicted image, and stored in the memory 2j.

The bit rate on the transmission path 3 is monitored, and when the transmission speed is lowered due for example to the conditions of the line, in a stream distribution in internet, the frame rate at which the encoding is performed at the image encoding circuit 2 is lowered, so that the encoding is in conformity with the transmission speed. In this case, the images are displayed at the decoding device, not shown, with the frame rate of the decoded images being varied depending on the transmission speed.

In the convention encoding device described above, the image encoding circuit 2 needs to lower the frame rate of the images transmitted to the decoding device when the transmission speed is lowered. In this case, the images decoded at the decoding device may be displayed with frames skipped, because the data of the frames of the images is partially missing.

SUMMARY OF THE INVENTION

The present invention has been made to eliminate the above problems. The invention provides an image encoding device which can transmit the image data without lowering the frame rate even when the transmission speed is lowered, by limiting the regions to be encoded or limiting the number of bits of the input image to be encoded.

According to one aspect of the invention, there is provided an image encoding device comprising:

an image signal input circuit receiving an image signal and dividing the image signal into macroblocks to generate block-divided image signals;

an image encoding circuit encoding the block-divided image signals output from the image signal input circuit, and outputting encoded image signals to a transmission path;

an encoded region designator designating regions to be encoded by the image encoding circuit according to a bit rate of the transmission path;

wherein said image encoding circuit encodes only those regions which are designated by said encoded region designator.

With the above arrangement, the region to be encoded can be limited when the transmission speed is lowered, so that the encoding can be performed without lowering the frame rate.

It may be so configured that said encoded region designator receives the bit rate of the transmission path and a motion vector detected by said image encoding circuit, and designates the encoded regions based on them.

With the above arrangement, only such part with a motion can be transmitted when the transmission speed is lowered.

It may be so configured that said encoded region designator receives the bit rate of the transmission path and region information input from the outside, and designates the encoded regions based on them.

With the above arrangement, when the transmission speed is lowered, the region having been designated can be transmitted without lowering the frame rate, and the power consumption required for the encoding can be reduced.

According to another aspect of the invention, there is provided an image encoding device comprising:

an image signal input circuit receiving an image signal and dividing the image signal into macroblocks to generate block-divided image signals;

an image encoding circuit encoding the block-divided image signals output from the image signal input circuit, and outputting encoded image signals to a transmission path;

a selector limiting the number of bits of the image signal to be encoded by the image encoding circuit according to a bit rate of the transmission path.

With the above arrangement, when the transmission speed is lowered, the number of bits of the input signal to be encoded can be limited, and the stream data can be reduced, without lowering the frame rate, and the power consumption can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

In the drawings.

DETAILED DESCRIPTION OF THE EMBODIMENTS

Embodiments of the invention will now be described with reference to the drawings.

Embodiment 1

Figure 1:
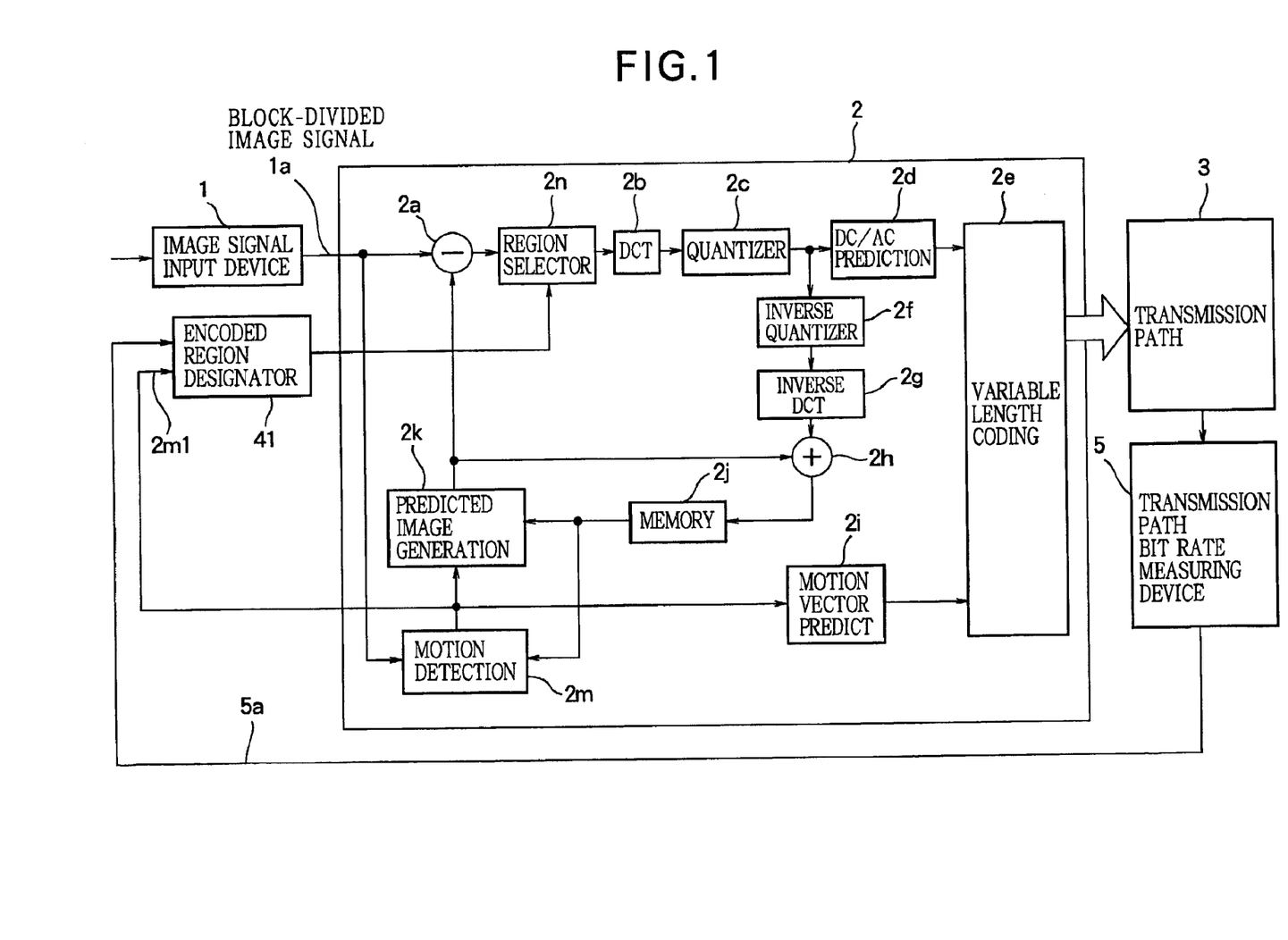
FIG. 1 is a block diagram showing an image encoding device of Embodiment 1 of the invention.

FIG. 1 shows an image encoding device of Embodiment 1 of the invention. In the drawing, reference numeral 1 denotes an image signal input circuit receiving an image signal (e.g., R, G and B signals) from an image signal generating device such as a camera, not shown, and converting the image signal into Y, Cb and Cr signals, and dividing the signals into macroblocks to generate block-divided image signals. Reference numeral 2 denotes an image encoding circuit receiving and encoding the block-divided image signals output from the image signal input circuit 1. Reference numeral 3 denotes a transmission path for transmitting the encoded image signals.

Figure 3:
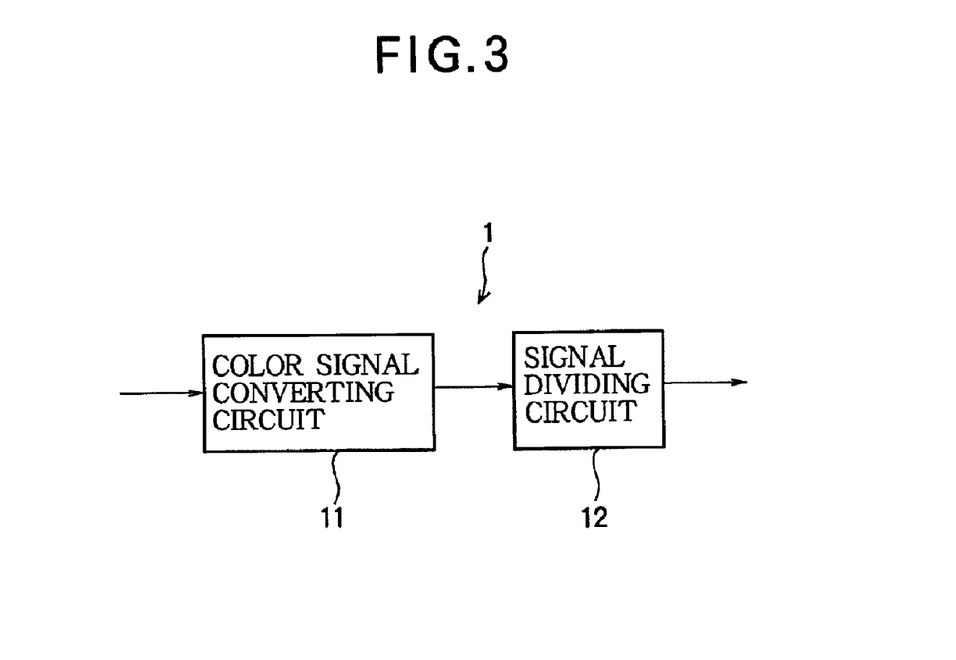
FIG. 3 is a block diagram showing the details of the image signal input circuit 1 in FIG. 1.

As illustrated in FIG. 3, the image signal input circuit 1 comprises a color signal converting circuit 11 which receives the image signal (e.g., R, G and B signals) from an image signal generating device such as a camera, not shown, and converts the image signal into luminance signal Y and chrominance signals Cb and Cr, and a signal dividing circuit 12 which receives the luminance signal Y and chrominance signals Cb and Cr output from the color signal converting circuit 11, and divides the signals into macroblocks to generate block-divided image signals.

The image encoding circuit 2 has a subtractor 2a receiving the input signal from the image signal input circuit 1 as a first input. The output of the subtractor 2a is passed through a region selector 2n, a DCT circuit 2b, and a quantizer 2c, and input to a DC/AC predictor 2d and an inverse quantizer 2f. The output of the DC/AC predictor 2d is supplied to a first input terminal of a variable length coding circuit 2e, which generates a bit stream based on the output of the DC/AC predictor 2d and the output of a motion vector predictor 2i, to be described later, and outputs the bit stream to the transmission path 3. The output of the inverse quantizer 2f is passed through an inverse DCT circuit 2g and supplied to a first input terminal of an adder 2h. The output of the adder 2h is supplied to a memory 2j, whose output is supplied to a first input terminal of a predicted image generating circuit 2k and a first input terminal of a motion detection circuit 2m. Supplied to a second input terminal of the motion detection circuit 2m is the input signal to the image encoding circuit 2 (the output of the image signal input circuit 1). The output of the motion detection circuit 2m is supplied to a second input terminal of the predicted image generating circuit 2k and the motion vector predictor 2i. The output of the motion vector predictor 2i is supplied to a second input terminal of the variable length coding circuit 2e. The output of the predicted image generating circuit 2k is supplied to a second input terminal of the subtractor 2a and a second input terminal of the adder 2h.

Input to an encoded region designator 41 are an output signal 2m1 of the motion detection circuit 2m and an output signal 5a of a transmission bit rate measuring device 5. The output of the encoded region designator 41 controls the operation of the region selector 2n.

The block-divided image signals output from the image signal input circuit 1 and input to the image encoding circuit 2 are signals having been divided into macroblocks, which are basic units of processing, as shown in FIG. 13. That is, when the input image signal is of 4:2:0, 16 pixels by 16 lines of the luminance signal (Y) has the same size on the screen as the 8 pixels by 8 lines of chrominance signals (Cb, Cr), so that 6 blocks of 8 pixels by 8 lines form one macroblock. Here, it is assumed that the input video object plane (VOP) is rectangular, and is identical to a frame.

The encoded region designator 41 designates the macroblocks to be encoded, according to the bit rate (transmission speed) input from the transmission bit rate measuring device 5, and controls the region selector 2n to switch the signals encoded by the image encoding circuit 2. This operation is described in further detail.

Figure 2:
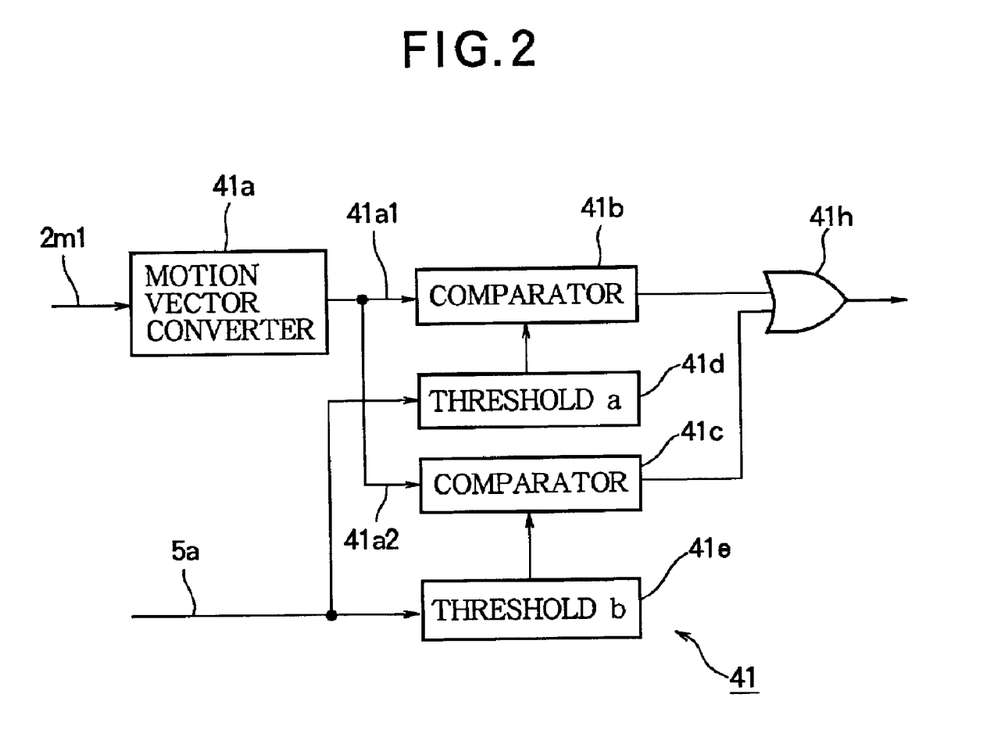
FIG. 2 is a block diagram showing an encoded region designator in Embodiment 1.

FIG. 2 shows the encoded region designator 41. A motion vector converter 41a determines a horizontal motion vector value 41a1 and a vertical motion vector value 41a2 for each macroblock from the motion vector 2m1 output from the motion detection circuit 2m, and outputs them to comparators 41b and 41c, respectively. The comparator 41b compares the horizontal vector value 41a1 with a threshold value 41d, which is switched according to the bit rate output from the transmission bit rate measuring device 5. The comparator 41c compares the vertical vector value 41a2 with a threshold value 41e, which is switched according to the bit rate output from the transmission bit rate measuring device 5.

The output of each of the comparators 41b and 41c is true (active) when the corresponding motion vector value supplied from the motion vector converter 41a is larger than the corresponding threshold value. The output of a logical inclusion circuit 41h which determines the logical inclusion (OR) of the outputs of the comparators 41b and 41c forms the output of the encoded region designator 41. Accordingly, it is possible to achieve control such that when the transmission speed is lowered, only those macroblocks that have greater motions are encoded, and the macroblocks which are of a still picture or with smaller motion are not encoded.

When the output of the encoded region designator 41 indicates that the encoding is to be conducted, the region selector 2n supplies the output of the subtractor 2a to the DCT circuit 2b. When the output of the encoded region designator 41 indicates that the encoding is not to be conducted, the region selector 2n supplies a "0" signal (indicating that the predicted error is zero) to the DCT circuit 2b.

The operations of the subtractor 2a, and of the DCT circuit 2b through the motion detection circuit 2m are identical to those of the prior art, so their description is omitted.

When the output of the encoded region designator 41 indicates that the encoding is not to be conducted, the output of the region selector 2n is zero, so that the image encoding circuit 2 does not encode the macroblock. That is, the image encoding circuit 2 encodes only those macroblocks designated by the encoded region designator 41. As a result, the transmitted stream data can be reduced, and the transmission is achieved without lowering the frame rate.

In the embodiment 1 described above, when the encoded region designator 41 judges that the macroblock is not to be encoded, control is so made that the output of the region selector 2n is set to be zero. As an alternative, the configuration may be such that the output of the encoded region designator 41 is input to the variable length coding circuit 2e, which outputs "not_coded" (a code that indicates that the macroblock has not been encoded) when it is judged that the macroblock is not to be encoded.

Embodiment 2

Figure 4:
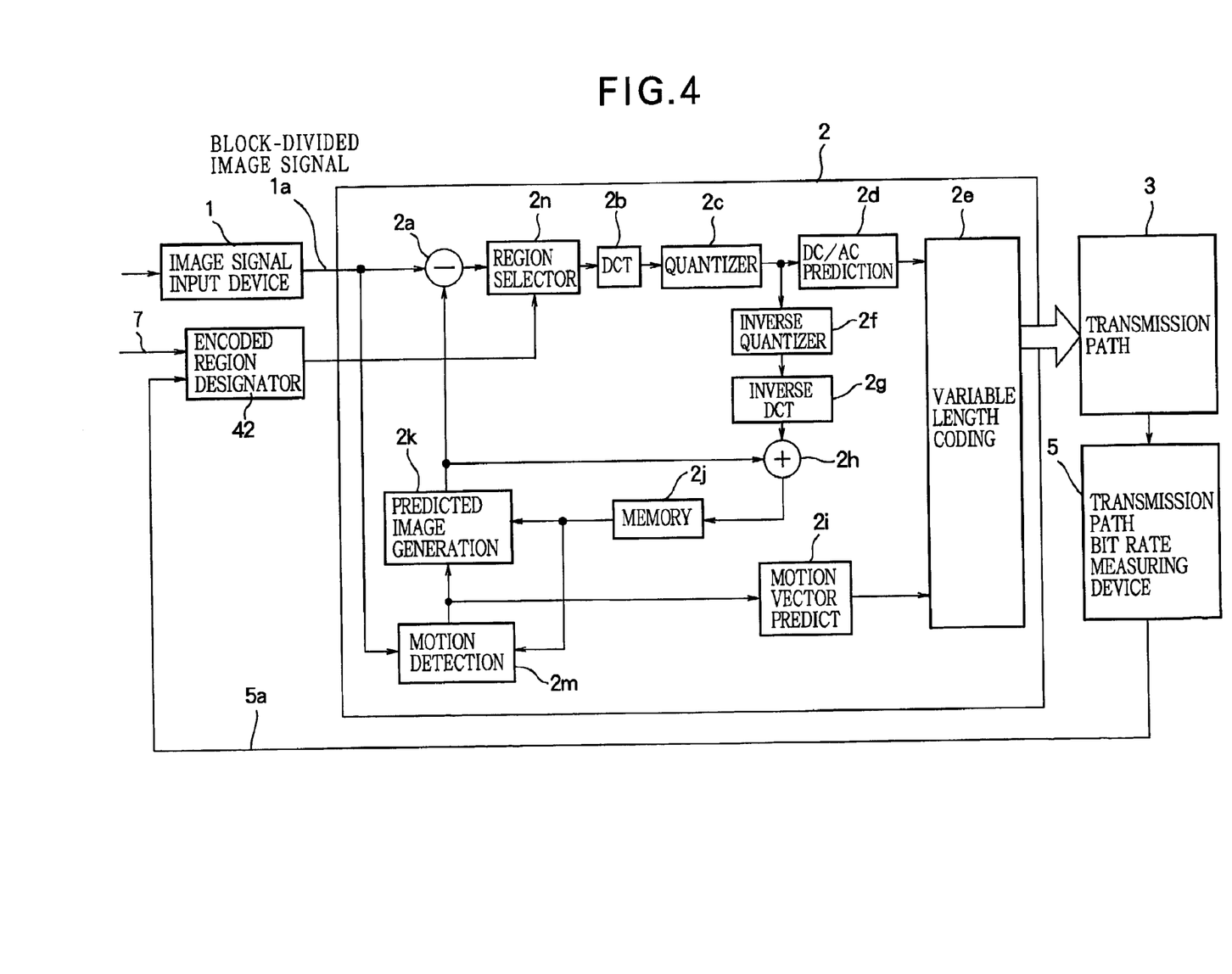
FIG. 4 is a block diagram showing an image encoding device of Embodiment 2 of the invention.

FIG. 4 shows an image encoding device of Embodiment 2 of the invention. In the drawing, reference numeral 1 denotes an image signal input circuit receiving an image signal (e.g., R, G and B signals) from an image signal generating device such as a camera, not shown, and converting the image signal into Y, Cb and Cr signals, and dividing the signals into macroblocks to generate block-divided image signals. The block-divided image signals output from the image signal input circuit 1 are input to an image encoding circuit 2.

The image encoding circuit 2 has a subtractor 2a receiving the input signal from the image signal input circuit 1 as a first input. The output of the subtractor 2a is passed through a region selector 2n, a DCT circuit 2b, and a quantizer 2c, and input to a DC/AC predictor 2d and an inverse quantizer 2f. The output of the DC/AC predictor 2d is supplied to a first input terminal of a variable length coding circuit 2e, which generates a bit stream based on the output of the DC/AC predictor 2d and the output of a motion vector predictor 2i, to be described later, and outputs the bit stream to the transmission path 3. The output of the inverse quantizer 2f is passed through an inverse DCT circuit 2g and supplied to a first input terminal of an adder 2h. The output of the adder 2h is supplied to a memory 2j, whose output is supplied to a first input terminal of a predicted image generating circuit 2k and a first input terminal of a motion detection circuit 2m. Supplied to a second input terminal of the motion detection circuit 2m is the input signal to the image encoding circuit 2. The output of the motion detection circuit 2m is supplied to a second input terminal of the predicted image generating circuit 2k and the motion vector predictor 2i. The output of the motion vector predictor 2i is supplied to a second input terminal of the variable length coding circuit 2e. The output of the predicted image generating circuit 2k is supplied to a second input terminal of the subtractor 2a and a second input terminal of the adder 2h.

Input to an encoded region designator 42 are a signal 7 supplied from the outside and indicating the designated regions, and an output signal 5a of a transmission bit rate measuring device 5. The output of the encoded region designator 42 controls the operation of the region selector 2n.

Embodiment 2 differs from Embodiment 1 in that the encoded region designator 42 is used in place of the encoded region designator 41 of Embodiment 1.

Figure 5:
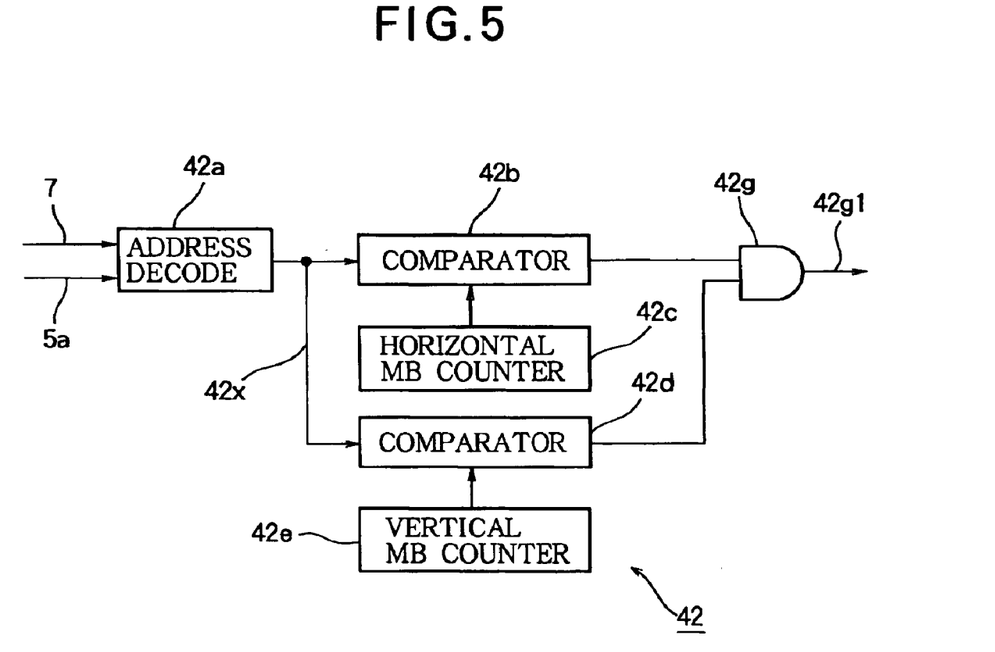
FIG. 5 is a block diagram showing an encoded region designator in Embodiment 2.

FIG. 5 shows the encoded region designator 42. An address decoder 42a outputs a signal 42x indicating a horizontal starting position, horizontal ending position, vertical starting position and vertical ending position, thereby indicating the region to be encoded, according to the bit rate of the transmission path 3, to comparators 42b and 42d.

For instance, if the size of the luminance signal of the image input from the image signal input circuit 1 is of 176 pixels in the horizontal direction and 144 pixels in the vertical direction, the number of macroblocks in the horizontal direction is 11 and the number of macroblocks in the vertical direction is 9. If the bit rate of the transmission path 3 is high, the horizontal starting position is set to be "0," the horizontal ending position is set to be "10," the vertical starting position is set to be "0," and the vertical ending position is set to be "8." In this case, the entire screen is encoded.

If the bit rate of the transmission path 3 is lowered, the horizontal starting position, the horizontal ending position, the vertical starting position and the vertical ending position are set such that only such regions that are designated by the signal 7 are encoded. For instance, if the signal 7 indicates a quarter of the entire screen at the center of the screen, that is if the position of the top left pixel of the region is at (44, 36), and the size of the region is 88 pixels in the horizontal direction and 72 pixels in the vertical direction, then the macroblocks including this region are selected, so that the horizontal starting position is set to be "2," the horizontal ending position is set to be "8," the vertical starting position is set to be "2," and the vertical ending position is set to be "6."

The signal 7 indicating the region may be a signal indicating a predetermined area, such as a quarter of the entire screen and at the center of the screen, or one half in the vertical direction and at the center of the screen, or left half of the screen, or the right half of the screen, or a signal indicating the position of the top left pixel of the region and the size of the region, or a signal indicating the positions of the top left pixel and the bottom right pixel of the region. The signal may give the indication in units of macroblocks, rather than in units of pixels.

The comparator 42b compares the horizontal direction macroblock count output from a horizontal MB counter 42c with the horizontal starting position and the horizontal ending position. Similarly, the comparator 42d compares the vertical direction macroblock count output from a vertical MB counter 42e with the vertical starting position and the vertical ending position. The output of each of the comparators 42b and 42d is true (active) when the following condition is met:

(starting position)≦(macroblock count)≦(ending position)

The output 42g1 of a logical conjunction circuit 42g determining the logical conjunction (AND) of the outputs of the comparators 42b and 42d forms the output of the encoding region designator 42.

When the above conditions are met with regard to both of the horizontal and vertical directions, the output 42g1 of the logical conjunction circuit 42g (supplied to the region selector 2n) is true (active), and the encoding at the image encoding circuit 2 is performed. The operation of the image encoding circuit 2 is identical to that in Embodiment 1, so that its description is omitted.

The image encoding circuit 2 encodes only those macroblocks that are designated by the encoding region designator 42, so that the transmitted stream data can be reduced, and the transmission can be achieved without lowering the frame rate.

In Embodiment 2, the signal indicating the region 7 may be a signal indicating a region preset at the time of starting the encoding. It is also possible to input by means of a pointing device or the like, not shown, to vary the horizontal starting position, the horizontal ending position, the vertical starting position, and the vertical ending position. When the signals are input by means of a pointing device or the like, the configuration may for example be such that the positions of the top let pixel and the bottom right pixel of the region are selected and input.

In Embodiment 2, if the boundary of the region in units of pixels, designated by the signal 7 does not coincide with a boundary between macroblocks, all the macroblocks including the region indicated by the signal 7 are encoded. However, the approximation of the designated region with the region in units of macroblocks can be made in any other method.

Embodiment 3

Figure 6:
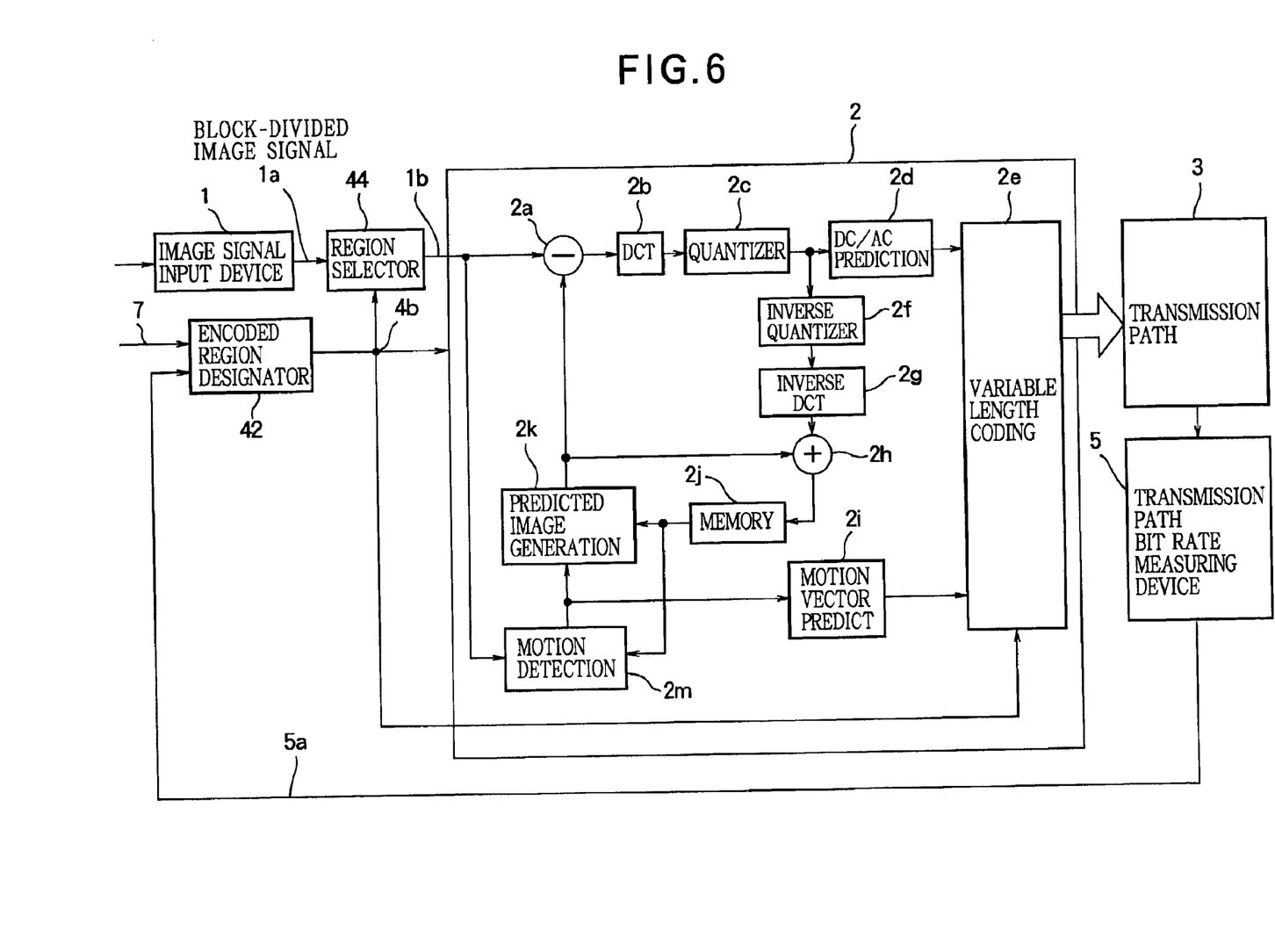
FIG. 6 is a block diagram showing an image encoding device of Embodiment 3 of the invention.

FIG. 6 shows an image encoding device of Embodiment 3 of the invention. In the drawing, reference numeral 1 denotes an image signal input circuit receiving an image signal (e.g., R, G and B signals) from an image signal generating device such as a camera, not shown, and converting the image signal into Y, Cb and Cr signals, and dividing the signals into macroblocks to generate block-divided image signals. The block-divided image signals output from the image signal input circuit 1 are input to an image encoding circuit 2.

The image encoding circuit 2 has a subtractor 2a receiving the input signal from the image signal input circuit 1 as a first input. The output of the subtractor 2a is passed through a DCT circuit 2b, and a quantizer 2c, and input to a DC/AC predictor 2d and an inverse quantizer 2f. The output of the DC/AC predictor 2d is supplied to a first input terminal of a variable length coding circuit 2e, which generates a bit stream based on the output of the DC/AC predictor 2d and the output of a motion vector predictor 2i, to be described later, and an encoded region designator 42, and outputs the bit stream to the transmission path 3. The output of the inverse quantizer 2f is passed through an inverse DCT circuit 2g and supplied to a first input terminal of an adder 2h. The output of the adder 2h is supplied to a memory 2j, whose output is supplied to a first input terminal of a predicted image generating circuit 2k and a first input terminal of a motion detection circuit 2m. Supplied to a second input terminal of the motion detection circuit 2m is the input signal to the image encoding circuit 2. The output of the motion detection circuit 2m is supplied to a second input terminal of the predicted image generating circuit 2k and the motion vector predictor 2i. The output of the motion vector predictor 2i is supplied to a second input terminal of the variable length coding circuit 2e. The output of the predicted image generating circuit 2k is supplied to a second input terminal of the subtractor 2a and a second input terminal of the adder 2h.

A signal 7 indicating the region designated from the outside and an output signal 5a of a transmission bit rate measuring device 5 are input to the encoded region designator 42. The output of the encoded region designator 42 controls a region selector 44. The output of the encoded region designator 42 is also supplied to a third input terminal of the variable length coding circuit 2e.

In Embodiment 3, when the encoded region designator 42 limits the region to be encoded, the image encoding circuit 2 conducts the encoding as if the size of the input image had been changed.

That is, when the encoded region designator 42 limits the region to be encoded, the variable length coding circuit 2e receives this control signal, and encodes the header information at the head of the VOP. The encoded header information is output to the transmission path 3. The control signal output from the encoded region designator 42 is also input to the region selector 44, and when the present macroblock is not the one to be encoded, and the signal output from the image signal input circuit 1 is not input to the image encoding circuit 2. During this period, the image encoding circuit 2 does not conduct the encoding at all.

Embodiment 4

Figure 7:
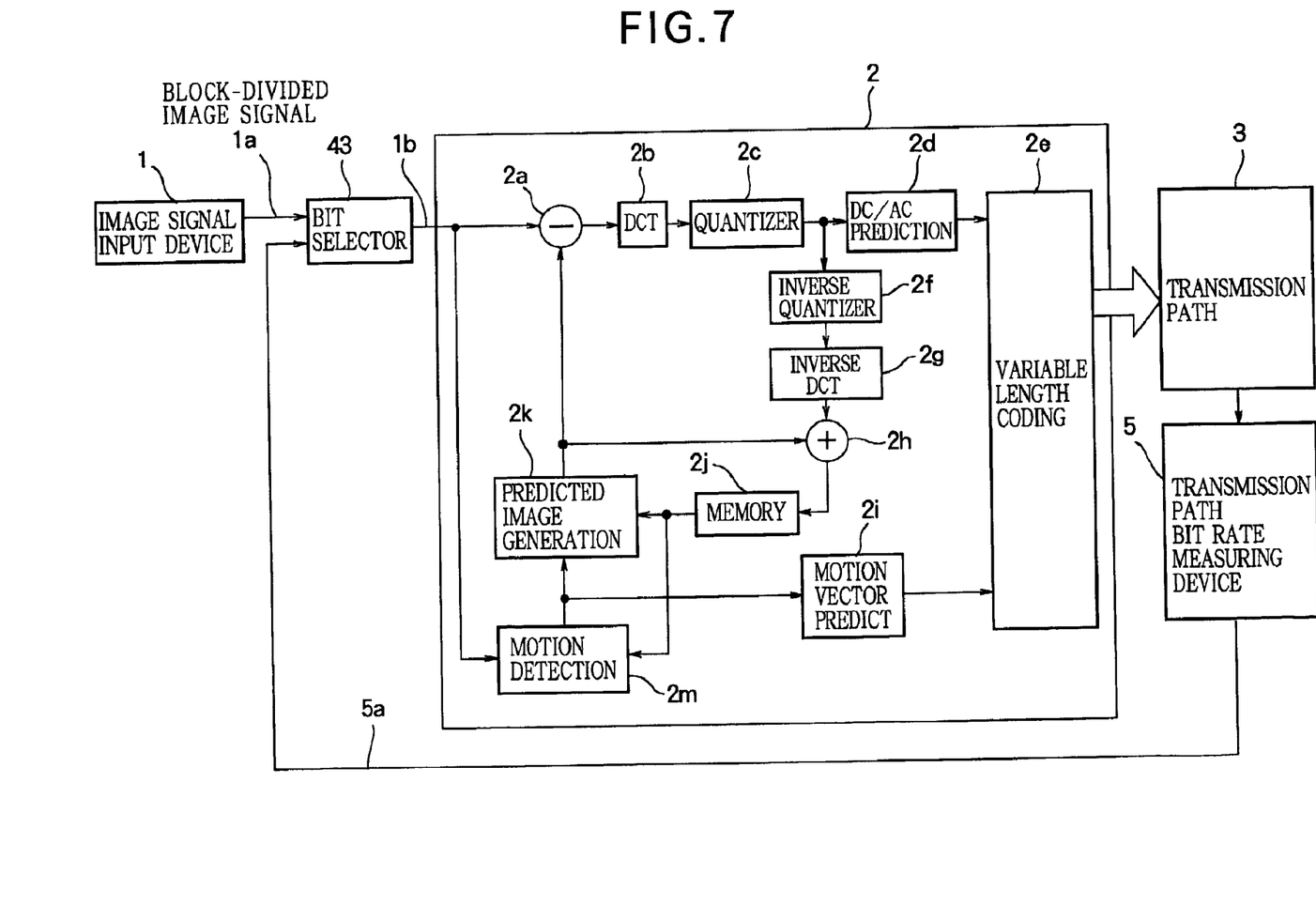
FIG. 7 is a block diagram showing an image encoding device of Embodiment 4 of the invention.

FIG. 7 shows an image encoding device of Embodiment 4 of the invention. In the drawing, reference numeral 1 denotes an image signal input circuit receiving an image signal (e.g., R, G and B signals) from an image signal generating device such as a camera, not shown, and converting the image signal into Y, Cb and Cr signals, and dividing the signals into macroblocks to generate block-divided image signals. The block-divided image signals output from the image signal input circuit 1 are input via a bit selector 43 to an image encoding circuit 2. The output of a transmission bit rate measuring device 5 is input to the bit selector 43 as a control signal.

The image encoding circuit 2 has a subtractor 2a receiving the input signal from the image signal input circuit 1, supplied through the bit selector 43, as a first input. The output of the subtractor 2a is passed through a DCT circuit 2b, and a quantizer 2c, and input to a DC/AC predictor 2d and an inverse quantizer 2f. The output of the DC/AC predictor 2d is supplied to a first input terminal of a variable length coding circuit 2e, which generates a bit stream based on the output of the DC/AC predictor 2d, and the output of a motion vector predictor 2i, to be described later, and outputs the bit stream to the transmission path 3. The output of the inverse quantizer 2f is passed through an inverse DCT circuit 2g and supplied to a first input terminal of an adder 2h. The output of the adder 2h is supplied to a memory 2j, whose output is supplied to a first input terminal of a predicted image generating circuit 2k and a first input terminal of a motion detection circuit 2m. Supplied to a second input terminal of the motion detection circuit 2m is the input signal to the image encoding circuit 2. The output of the motion detection circuit 2m is supplied to a second input terminal of the predicted image generating circuit 2k and the motion vector predictor 2i. The output of the motion vector predictor 2i is supplied to a second input terminal of the variable length coding circuit 2e. The output of the predicted image generating circuit 2k is supplied to a second input terminal of the subtractor 2a and a second input terminal of the adder 2h.

The bit selector 43 transfers the input image to the image encoding circuit 2 after switching the number of bits of the input image, according to the bit rate of the transmission path.

Figure 8:
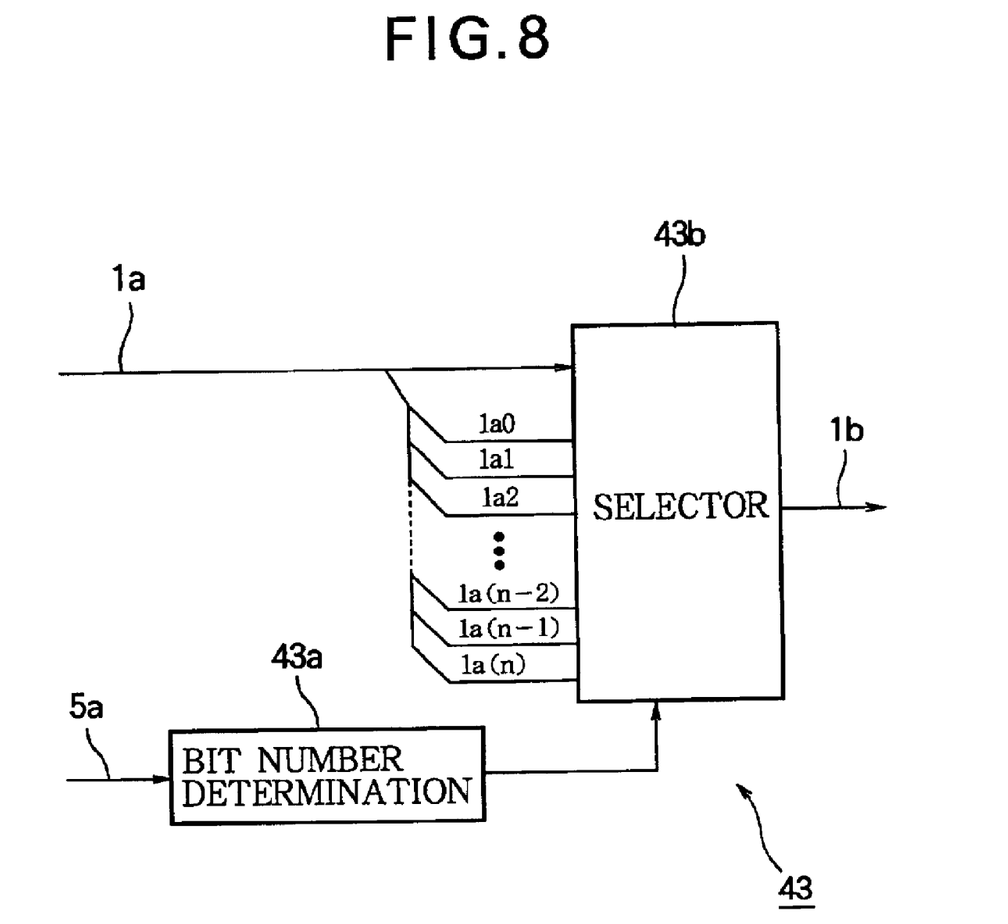
FIG. 8 is a block diagram showing a bit selector in Embodiment 4.

FIG. 8 shows the bit selector 43. A bit number determining circuit 43a determines the number of bits per pixel of the input image, according to the bit rate of the transmission path 3, and sends a control signal to a selector 43b. The selector 43b switches the number of bits of the signal (block-divided image signal) 1a from the image input signal. For instance, when the transmission speed is lowered, it selects and outputs the bits 1a(n) to 1a2 on the MSB side, of the input signal 1a(n) to 1a0. The selected number of bits is switched according to the transmission speed. The output of the selector 43b is supplied to the image encoding circuit 2.

The operation of the image encoding circuit 2 is identical to that of the prior art, so that its description is omitted.

When the transmission speed is lowered, the number of bits of the input image is reduced by the bit selector 43, so that the stream data generated by the image encoding circuit 2 can be reduced, and the transmission to the decoding device is achieved without lowering the frame rate.

Embodiment 5

Figure 9:
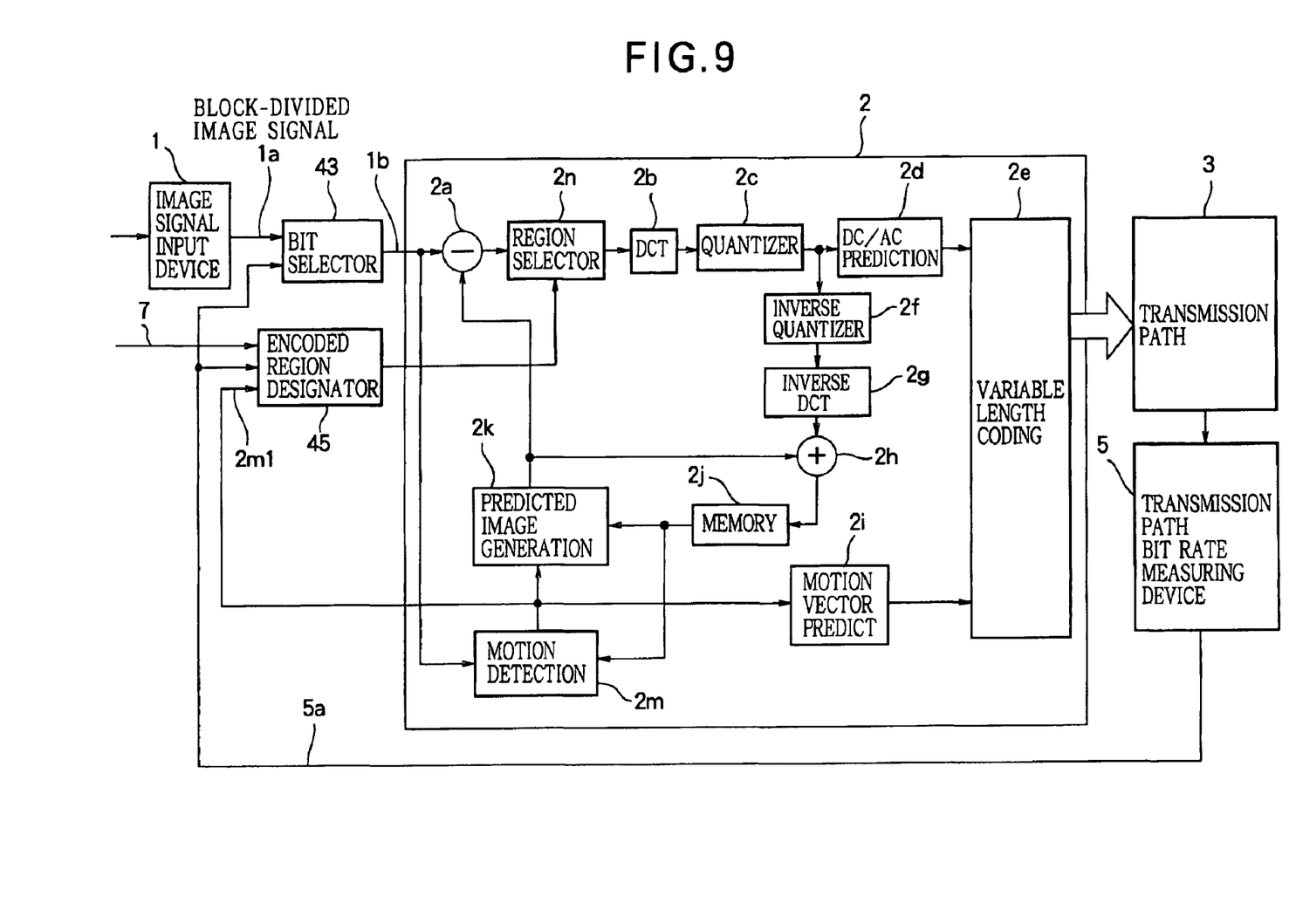
FIG. 9 is a block diagram showing an image encoding device of Embodiment 5 of the invention.

FIG. 9 shows an image encoding device of Embodiment 5 of the invention. In the drawing, reference numeral 1 denotes an image signal input circuit receiving an image signal (e.g., R, G and B signals) from an image signal generating device such as a camera, not shown, and converting the image signal into Y, Cb and Cr signals, and dividing the signals into macroblocks to generate block-divided image signals. The block-divided image signals output from the image signal input circuit 1 are input via a bit selector 43 to an image encoding circuit 2. The output of a transmission bit rate measuring device 5 is supplied as a control signal to the bit selector 43.

The image encoding circuit 2 has a subtractor 2a receiving the input signal from the bit selector 43 as a first input. The output of the subtractor 2a is passed through a region selector 2n, a DCT circuit 2b, and a quantizer 2c, and input to a DC/AC predictor 2d and an inverse quantizer 2f. The output of the DC/AC predictor 2d is supplied to a first input terminal of a variable length coding circuit 2e, which generates a bit stream based on the output of the DC/AC predictor 2d, and the output of a motion vector predictor 2i, to be described later, and outputs the bit stream to the transmission path 3. The output of the inverse quantizer 2f is passed through an inverse DCT circuit 2g and supplied to a first input terminal of an adder 2h. The output of the adder 2h is supplied to a memory 2j, whose output is supplied to a first input terminal of a predicted image generating circuit 2k and a first input terminal of a motion detection circuit 2m. Supplied to a second input terminal of the motion detection circuit 2m is the input signal to the image encoding circuit 2. The output of the motion detection circuit 2m is supplied to a second input terminal of the predicted image generating circuit 2k and the motion vector predictor 2i. The output of the motion vector predictor 2i is supplied to a second input terminal of the variable length coding circuit 2e. The output of the predicted image generating circuit 2k is supplied to a second input terminal of the subtractor 2a and a second input terminal of the adder 2h.

Input to an encoded region designator 45 are an output signal 2m1 of the motion detection circuit 2m, the output signal 5a of the transmission bit rate measuring device 5, and a signal 7 supplied from the outside and indicating the designated regions. The output of the encoded region designator 45 controls the region selector 2n.

Embodiment 5 differs from Embodiment 4 in that in addition to the bit selector 43, the encoded region designator 45 is provided. The operation of the bit selector 43 is identical to that of Embodiment 4.

Figure 10:
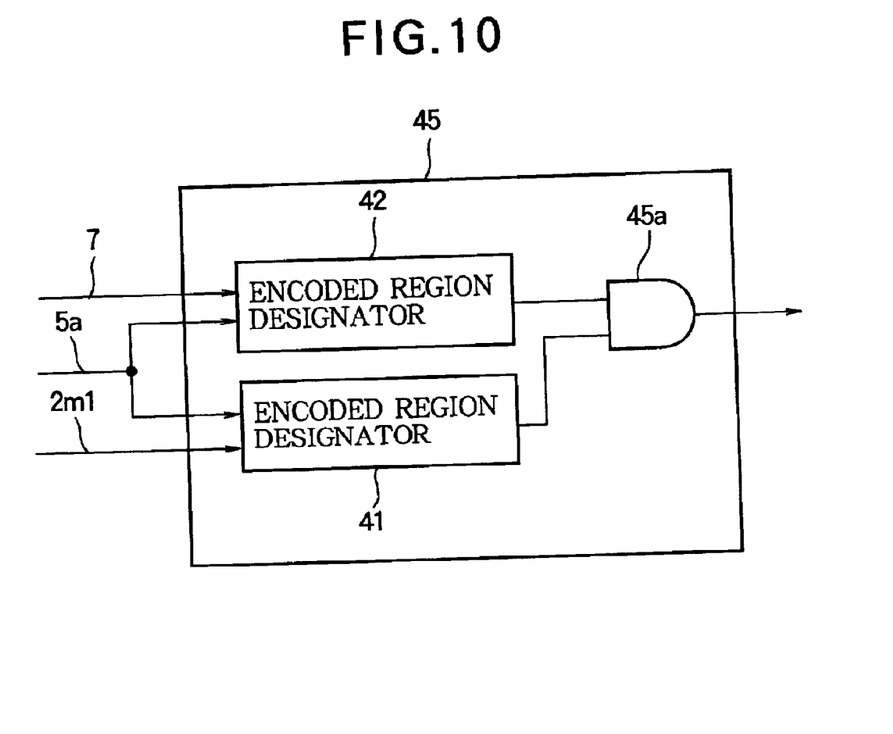
FIG. 10 is a block diagram showing an encoded region designator in Embodiment 5.

An example of the encoded region designator 45 is shown in FIG. 10. In the drawing, reference numeral 41 denotes an encoded region designator (identical to the encoded region designator 41 of Embodiment 1 shown in FIG. 1) receiving the output signal 5a of the transmission bit rate measuring device, and the output signal 2m1 of the motion detection circuit 2m. Reference numeral 42 denotes an encoded region designator (identical to the encoded region designator 42 of Embodiment 2 shown in FIG. 4) receiving the output signal 5a of the transmission bit rate measuring device 5, and the signal 7 supplied from the outside and indicating the designated region. The output of a logical conjunction circuit 45a determining the logical conjunction of the outputs of the encoded region designators 41 and 42 forms the output of the encoded region designator 45.

The operation of the encoded region designator 41 is identical to that of Embodiment 1, and the operation of the encoded region designator 42 is identical to that of Embodiment 2. When the transmission speed is lowered, the encoded region designator 45 controls the image encoding circuit 2 such that only such parts of the designated region in which the motion is large are encoded. The operation of the image encoding circuit 2 from the subtractor 2*a* through the region selector 2*n* is identical to that of Embodiment 1, so that its description is omitted.

In Embodiment 5, both of the bit selector 43 and the encoded region designator 45 are provided so that when the transmission speed is lowered, the region to be encoded is limited, and the number of bits of the input image is also reduced, so that the stream data generated by the image encoding circuit 2 can be reduced and the transmission to the decoding device is achieved without lowering the frame rate.

In Embodiment 5, the encoded region designator 45 is configured such that the logical conjunction of the outputs of the encoded region designator 41 and the output of the encoded region designator 42 is determined. As an alternative, the encoded region designator 45 may be configured to determine the logical inclusion of the outputs of the encoded region designator 41 and the output of the encoded region designator 42. In this case, the image encoding circuit 2 is so controlled as to encode only the region designated from the outside or the part with a large motion when the transmission speed is lowered.

The configuration of the encoded region designator 45 is not limited to the above example, but the region to be encoded may be determined in any manner, based on the bit rate 5*a* of the transmission path 3, the motion vector 2*m*1, and the region 7 designated from the outside.

In Embodiment 5, both of the bit selector 43 and the encoded region designator 45 are provided. The configuration may alternatively such that only the encoded region designator 45 is provided.

In Embodiment 5, the bit selector 43 and the encoded region designator 45 are provided. As an alternative, the configuration may be such that, in place of the encoded region designator 45, the encoded region designator 41 or the encoded region designator 42 is provided.

Figure 11:
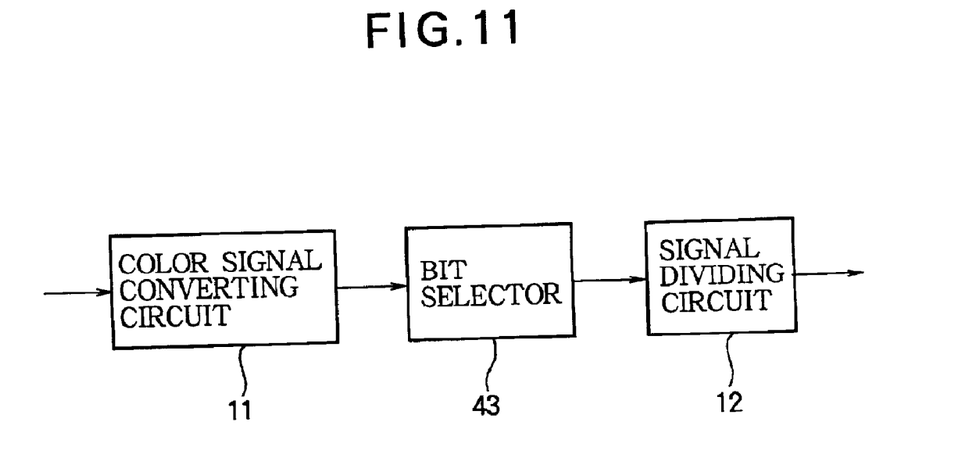
FIG. 11 is a block diagram showing a variation of the position where the bit selector is inserted.

In the example of FIG. 7 and in the example of FIG. 9, the number of bits of the block-divided image signals output from the signal dividing circuit 12 in the image signal input circuit 1 and input to the image encoding circuit 2 is limited. As an alternative, a bit selector 43 may be inserted between the color signal converting circuit 11 and the signal dividing circuit 12 of the image signal input circuit 1, as shown in FIG. 11, and the numbers of bits of the luminance signal (Y) and the chrominance signals (Yb, Yr) output from the color signal converting circuit 11 and input to the signal dividing circuit 12 may be limited.

The above description is made in connection with encoding according to MPEG 4. Even in the case of H263, or the like, similar configuration may be used to limit the region to be encoded, or the number of bits of the input signal to be encoded.

What is claimed is:

1. An image encoding device comprising:

an image signal input circuit receiving an image signal and dividing the image signal into macroblocks to generate block-divided image signals;

an image encoding circuit encoding the block-divided image signals output from the image signal input circuit, and outputting encoded image signals to a transmission path;

an encoded region designator designating regions to be encoded by the image encoding circuit according to a bit rate of the transmission path;

wherein said image encoding circuit encodes only those regions which are designated by said encoded region designator;

wherein said encoded region designator receives the bit rate of the transmission path and a motion vector detected by said image encoding circuit, and designates the encoded regions based on them;

a motion vector converter receiving the motion vector and converting the motion vector into a horizontal motion vector value and a vertical motion vector value;

a first comparator comparing the horizontal motion vector value to a first threshold;

a second comparator comparing the vertical motion vector value to a second threshold; and a logical OR circuit receiving comparison results from said first and second comparators, wherein the first and second thresholds are based on the bit rate of the transmission path, and wherein the comparison results are true when the respective motion vector value is greater than the respective threshold such that only those macroblocks having a motion vector value exceeding a respective one of the thresholds are designated by said encoded region designator.

2. The image encoding device as set forth in claim 1, said image encoding circuit including a region selector selecting which regions of the block-divided image signals are to be encoded and which are not to be encoded and;

said region selector being controlled by said encoded region designator such that only those macroblocks designated by said encoded region designator are selected by said region selector for encoding by said image encoding circuit.

3. An image encoding device comprising:

an image signal input circuit receiving an image signal and dividing the image signal into macroblocks to generate block-divided image signals;

an image encoding circuit encoding the block-divided image signals output from the image signal input circuit, and outputting encoded image signals to a transmission path;

an encoded region designator designating regions to be encoded by the image encoding circuit according to a bit rate of the transmission path;

wherein said image encoding circuit encodes only those regions which are designated by said encoded region designator;

wherein said encoded region designator receives the bit rate of the transmission path and region information indicating boundaries of a region and designates the encoded regions based on them;

an address decoder receiving the region information and the bit rate of the transmission path, said address decoder setting horizontal and vertical start/end positions of the designated region to be encoded according to the bit rate of the transmission path;

a first comparator comparing the horizontal start/end positions against a horizontal macroblock count;

a second comparator comparing the vertical start/end positions against a vertical macroblock count; and a logical AND circuit receiving comparison results from said first and second comparators, wherein the comparison results are true when the respective macroblock counts are between the corresponding start and end positions.

4. The image encoding device as set forth in claim 3, said image encoding circuit including a region selector selecting which regions of the block-divided image signals are to be encoded and which are not to be encoded; and said region selector being controlled by said encoded region designator such that only those macroblocks designated by said encoded region designator are selected by said region selector for encoding by said image encoding circuit.

5. An image encoding device comprising:

an image signal input circuit receiving an image signal and dividing the image signal into macroblocks to generate block-divided image signals;

an image encoding circuit encoding the block-divided image signals output from the image signal input circuit, and outputting encoded image signals to a transmission path;

a first encoded region designator receiving a bit rate of the transmission path and a motion vector detected by said image encoding circuit, and designating a first encoded region based on the bit rate of the transmission path and the motion vector;

a second encoded region designator receiving the bit rate of the transmission path and region information, and designating a second encoded region based on the bit rate of the transmission path and the region information;

wherein said image encoding circuit encodes only those regions which are designated by both said first and second encoded region designators.

6. The image encoding device as set forth in claim 5, further comprising:

a logical AND circuit performing a logical AND function between the first and second designated encoded regions.

7. The image encoding device as set forth in claim 5, further comprising:

a bit selector limiting the number of bits per pixel of the image signal to be encoded by the image encoding circuit according to a bit rate of the transmission path.

8. The image encoding device as set forth in claim 7, said bit selector including:

a bit number determining circuit receiving the bit rate of the transmission path and determining the number of most significant bits per pixel of the image signal according to the bit rate of the transmission path; and a selector receiving the block-divided image signals and selecting the determined number of most significant bits per pixel from the block-divided image signals, wherein the number of most significant bits per pixel varies according to the bit rate of the transmission path.

* * * * *